US009871909B2

(12) United States Patent
Watanabe et al.

(10) Patent No.: US 9,871,909 B2
(45) Date of Patent: Jan. 16, 2018

(54) MOBILE ELECTRONIC DEVICE, CONTROL METHOD, AND NON-TRANSITORY STORAGE MEDIUM

(71) Applicant: KYOCERA Corporation, Kyoto-shi, Kyoto (JP)

(72) Inventors: Kouji Watanabe, Yokohama (JP); Shinya Mizuno, Machida (JP)

(73) Assignee: KYOCERA CORPORATION, Kyoto (JP)

( * ) Notice: Subject to any disclaimer, the term of this patent is extended or adjusted under 35 U.S.C. 154(b) by 0 days.

(21) Appl. No.: 15/306,469

(22) PCT Filed: Apr. 23, 2015

(86) PCT No.: PCT/JP2015/062441
§ 371 (c)(1),
(2) Date: Oct. 24, 2016

(87) PCT Pub. No.: WO2015/163428
PCT Pub. Date: Oct. 29, 2015

(65) Prior Publication Data
US 2017/0048381 A1  Feb. 16, 2017

(30) Foreign Application Priority Data
Apr. 25, 2014  (JP) .................... 2014-091982

(51) Int. Cl.
H04B 1/38      (2015.01)
H04M 1/725    (2006.01)
H04M 1/60     (2006.01)

(52) U.S. Cl.
CPC ... H04M 1/72569 (2013.01); H04M 1/72566 (2013.01); *H04M 1/6075* (2013.01); *H04M 2250/12* (2013.01)

(58) Field of Classification Search
CPC .................. H04M 1/2569; H04M 1/72566
See application file for complete search history.

(56) References Cited

U.S. PATENT DOCUMENTS

2008/0157606 A1* 7/2008 Fukutome ............ H04B 1/0003
307/126
2010/0233998 A1* 9/2010 Saito .................... H04M 1/6075
455/412.2
(Continued)

FOREIGN PATENT DOCUMENTS

JP   2004-336194 A    11/2004
JP   2004336194 A  *  11/2004
(Continued)

OTHER PUBLICATIONS

International Search Report in PCT/JP2015/062441, dated Jun. 23, 2015.

*Primary Examiner* — Md Talukder
(74) *Attorney, Agent, or Firm* — Hauptman Ham, LLP

(57) ABSTRACT

In one embodiment, a mobile electronic device includes at least one controller that enables a silent mode setting when a state of being in a vehicle is determined and that enables the silent mode setting when a set time is reached, and the at least one controller suspends the enabling of the silent mode setting based on the set time when the set time is reached after having determined the state of being in a vehicle. When in the state of being in a vehicle, the mobile electronic device does not enable the silent mode setting based on the set time but enables the silent mode setting based on the state of being in a vehicle even when the time of enabling the silent mode setting based on the set time is reached.

4 Claims, 3 Drawing Sheets

(56) References Cited

U.S. PATENT DOCUMENTS

| | | | |
|---|---|---|---|
| 2011/0065484 A1* | 3/2011 | Liu | H04M 1/72569 455/569.2 |
| 2012/0303360 A1* | 11/2012 | Grokop | G10L 21/0208 704/201 |
| 2013/0079026 A1* | 3/2013 | Hagedorn | H04W 4/027 455/456.1 |
| 2016/0106368 A1* | 4/2016 | Wu | G01P 13/00 702/50 |
| 2017/0048381 A1* | 2/2017 | Watanabe | H04M 1/72569 |

FOREIGN PATENT DOCUMENTS

| | | |
|---|---|---|
| JP | 2007-142593 A | 6/2007 |
| JP | 2011-250152 A | 12/2011 |

\* cited by examiner

FIG.2

|  | BEING IN VEHICLE | OTHER THAN BEING IN VEHICLE |
|---|---|---|
| SILENT MODE SETTING BASED ON STATE OF BEING IN VEHICLE | ON | ON OR OFF |
| SILENT MODE SETTING BASED ON SET TIME | SUSPENDED | ON OR OFF |

30B

MOBILE ELECTRONIC DEVICE, CONTROL METHOD, AND NON-TRANSITORY STORAGE MEDIUM

RELATED APPLICATIONS

The present application is a National Phase entry of International Application No. PCT/JP2015/062441, filed Apr. 23, 2015, which claims priority of Japanese Application No. 2014-091982, filed Apr. 25, 2014.

FIELD

The present application relates to a mobile electronic device, a control method, and a storage medium.

BACKGROUND

In electronic apparatuses such as a mobile phone or smartphone, some have a function of notifying a user of an event such as a schedule, an incoming call, or mail reception. For example, a mobile phone in Japanese Patent Application Laid-open No. 2011-250152 periodically blinks an LED when there is a missed call. Of the mobile phones that have the function of notifying the user of an event such as a schedule, an incoming call, or mail reception, some give notice of the event by vibration and the like according to a silent mode setting.

SUMMARY

A mobile electronic device, a control method, and a non-transitory storage medium are disclosed.

A mobile electronic device according to one aspect includes at least one controller. The controller determines a state of being in a vehicle. The controller enables a silent mode setting when the state of being in a vehicle is determined. The controller enables the silent mode setting when a set time is reached. The controller suspends the enabling of the silent mode setting based on the set time when the set time is reached after having determined the state of being in a vehicle.

A control method according to one aspect includes suspending the enabling of a silent mode setting based on a set time when the set time is reached after having determined a state of being in a vehicle.

A non-transitory storage medium according to one aspect stores therein a control program that causes a mobile electronic device including at least one controller to execute suspending the enabling of a silent mode setting based on a set time when the set time is reached after having determined a state of being in a vehicle.

BRIEF DESCRIPTION OF THE DRAWINGS

FIG. 2 illustrates one example of a silent-mode setting table.

DETAILED DESCRIPTION OF THE PREFERRED EMBODIMENTS

The following describes an exemplary embodiment in detail while referring to the accompanying drawings.

Figure 1:
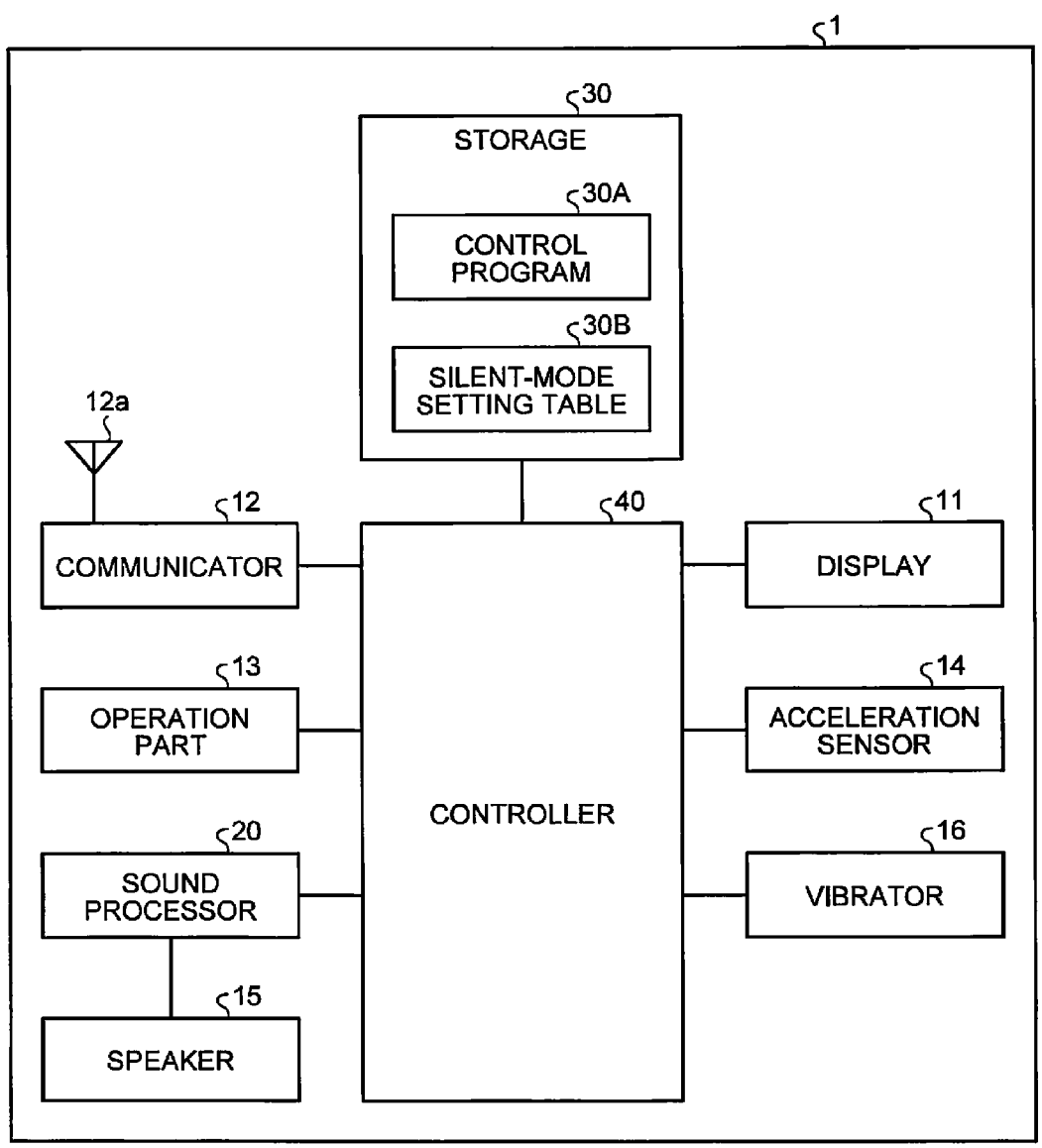
FIG. 1 is a block diagram illustrating a functional configuration of a mobile electronic device according to the present embodiment.

A mobile electronic device 1 is one example of a mobile electronic device according to the present embodiment. FIG. 1 is a block diagram illustrating a functional configuration of the mobile electronic device 1. The mobile electronic device 1 includes a display 11, a communicator 12, an operation part 13, an acceleration sensor 14, a speaker 15, a vibrator 16, a sound processor 20, a storage 30, and a controller 40.

The display 11 includes a display of any desired. The display 11 displays, thereon, video corresponding to video data supplied from the controller 40 or an image corresponding to image data supplied from the controller 40. The display includes a display device such as a liquid crystal display (LCD), an organic electro-luminescence display (OELD), or an inorganic electro-luminescence display (IELD), for example. The display 11 may include a sub-display, in addition thereto.

The display 11 may include a touch screen. The touch screen detects contact of a finger, a pen, a stylus pen, or the like (hereinafter simply referred to as "finger") with the touch screen. The touch screen can detect positions where a plurality of fingers, the pen, the stylus pen, or the like came in contact with the touch screen. The touch screen notifies the controller 40 of the contact of the finger with the touch screen together with the position on the display where the contact was made. The detection method of the touch screen may be any method such as a capacitive sensing method, a resistive membrane method, a surface acoustic wave method (or an ultrasonic sensing method), an infrared ray method, an electromagnetic induction method, and a load detection method. The controller 40, based on at least one of the contact detected by the touch screen, the position of the detected contact, the change in the position of the detected contact, the interval of the detected contact, and the number of times of the detected contact, determines operation performed on the screen and others displayed on the display and determines the type of gesture made to the display.

The communicator 12 includes an antenna 12a. The communicator 12, via a channel allocated by a base station accommodated in a communication network, establishes a wireless signal link with the base station. The wireless signal link established between the communicator 12 and the base station is established by such as a code division multiple access (CDMA) method. The communicator 12 performs information communication with other communication devices and the like via the base station. The communicator 12 may be capable of performing information communication with other communication devices via a station that is other than the base station accommodated in the communication network. For example, the communicator 12 may be capable of performing communication with an access point in a wireless local area network (LAN).

The communicator 12 may receive a radio signal of a certain frequency band from GPS satellites. The communicator 12 may perform a demodulation process of the received radio signal and transmit the processed signal to the controller 40. The controller 40 which will be described later may perform a positioning process based on the signal delivered from the communicator 12. The mobile electronic device 1 may be provided with a communicator that performs communication with GPS satellites, separately from the communicator 12.

The operation part 13 includes a plurality of keys to which various functions are assigned. When these keys are operated by a user of the mobile electronic device 1, the operation part 13 generates a signal corresponding to the operation content thereof. The generated signal is input to the controller 40 as an instruction of the user.

The acceleration sensor 14 detects, based on direction and magnitude of acceleration acting on the mobile electronic device 1, vibration and movement of the mobile electronic device 1. The acceleration sensor 14 generates a signal corresponding to the detection result thereof. The generated signal is input to the controller 40.

The speaker 15 outputs sound corresponding to a sound signal processed by the sound processor 20 which will be described later.

The sound processor 20 performs processing of the sound signal to be output from the speaker 15. The sound processor 20 performs the processes of decoding, digital-to-analog conversion, amplification, and others on sound data sent from the controller 40, and outputs the processed signal to the speaker 15 after converting the processed signal into an analog sound signal.

The vibrator 16 vibrates a part or the entirety of the mobile electronic device 1. The vibrator 16 includes, to generate vibration, a piezoelectric element, an eccentric motor, or the like, for example. The vibration by the vibrator 16 is used to notify the user of various events such as an incoming call. Although not illustrated in FIG. 1, the functional modules such as a battery that are inevitably used to maintain the functionality of the mobile electronic device 1 are mounted on the mobile electronic device 1.

The storage 30 stores therein various programs used for the processing performed in the controller 40 such as an operating system program and application programs, and stores therein a variety of data used in the processing performed in the controller 40. For example, the storage 30 stores therein a task to activate an application program that controls operation of the display 11, a task to activate an application program that controls operation of the communicator 12, a task to activate an application program that controls operation of the sound processor 20, and others. The storage 30, in addition to these tasks, stores therein temporary data and others used in the process based on the various programs.

The storage 30 stores therein a control program 30A and a silent-mode setting table 30B.

The control program 30A provides functions concerning various control of the mobile electronic device 1. The control program 30A measures vibration and movement of the mobile electronic device 1 detected by the acceleration sensor 14 in collaboration with the acceleration sensor 14 and, based on the measurement result of the vibration and movement (hereinafter described as an acceleration pattern when appropriate), determines a moving state of the user of the mobile electronic device 1 (hereinafter simply described as a moving state when appropriate), for example. The moving state includes a first state and a second state. For example, the first state is a state of being in a vehicle, and the second state is a state other than the state of being in a vehicle. The control program 30A determines, based on the detection result by the acceleration sensor 14, whether it is the first state or is the second state. The control program 30A determines that it is the first state when the acceleration pattern obtained from the measurement result of the vibration and movement of the mobile electronic device 1 matches, with certain accuracy, the acceleration pattern detected in the first state, for example. The control program 30A determines that it is the second state when the acceleration pattern obtained from the measurement result of the vibration and movement of the mobile electronic device 1 does not match the acceleration pattern detected in the first state, for example.

The control program 30A provides a function of changing a silent mode setting. The silent mode setting is a setting that defines notification means of the mobile electronic device 1 when an event occurred. The silent mode setting includes a first notification method and a second notification method. For example, the first notification method is a notification method that an event is notified by outputting sound from the speaker 15. For example, the second notification method is a notification method that an event is notified by the vibration of the vibrator 16 or the light emission of an LED, not by means of outputting the sound. The function of changing the silent mode setting corresponds to a function of switching to one of the first notification method and the second notification method to the other. The silent mode setting includes a first control and a second control. For example, the first control is a control, based on a moving state, of switching to one of the first notification method and the second notification method to the other. For example, the second control is a control, based on a set time, of switching to one of the first notification method and the second notification method to the other. The mobile electronic device 1 may enable the silent mode setting by switching to the first notification method on condition that it is determined that the user is being in the first state. The mobile electronic device 1 may enable the silent mode setting by switching to the first notification method after a desired set time set by a user. The mobile electronic device 1 may enable the silent mode setting by switching to the second notification method after a desired set time set by a user. The control program 30A provides a function of suspending the enabling of the silent mode setting by the second control when the reaching of a set time of the second control is detected in collaboration with a clock circuit after having determined the first state in collaboration with the acceleration sensor 14. The controller 40 that executes the control program 30A can detect the current time based on a radio-wave time signal of a clock circuit provided inside the mobile electronic device 1, for example. Then, the controller 40, by comparing the current time with the desired set time set by a user, can detect the reaching of the set time of the second control.

The control program 30A, when it is determined to be the first state in collaboration with the acceleration sensor 14, provides the following various functions in accordance with the silent-mode setting table 30B. The control program 30A suspends the enabling of the silent mode setting by the second control when the reaching of the set time of the second control is detected in collaboration with the clock circuit after it is determined to be the first state in collaboration with the acceleration sensor 14. The control program 30A, when it is determined to be the first state in collaboration with the acceleration sensor 14 after the silent mode setting is enabled by the second control, suspends the enabling of the silent mode setting by the second control and enables the silent mode setting by the first control, for example.

The control program 30A, when it is determined to be the first state in collaboration with the acceleration sensor 14, refers to a silent-mode setting table 30B and provides the following various functions. The control program 30A, when the reaching of the set time for the second control is detected in collaboration with the clock circuit, enables the silent mode setting by the second control on condition that the second state is being determined in collaboration with the acceleration sensor 14, for example. The control program 30A, when the second state is determined in collaboration with the acceleration sensor 14 under the condition of suspending the enabling of the silent mode setting by the second control and further enabling the silent mode setting by the first control, cancels the suspending and enables the silent mode setting by the second control, for example.

FIG. 2 is a table illustrating one example of a silent-mode setting table. In the silent-mode setting table 30B, when "ON" is recorded, the control program 30A enables the silent mode setting so that an event is notified by the second notification method. When "OFF" is recorded in the silent-mode setting table 30B, the control program 30A enables the silent mode setting so that an event is notified by the first notification method. When "SUSPENDED" is recorded in the silent-mode setting table 30B, the control program 30A does not enable the silent mode setting by the second control even when the set time of the second control is reached. In the silent-mode setting table 30B, in the item of "BEING IN VEHICLE" that corresponds to the first state, "ON" is recorded as the silent mode setting by the first control, and "SUSPENDED" is recorded as the silent mode setting by the second control. In the silent-mode setting table 30B, in the item of "OTHER THAN BEING IN VEHICLE" that corresponds to the second state, "ON OR OFF" is recorded as the silent mode setting by the first control. That is, the silent mode setting is set to be ON or OFF as being the same before determining the first state. In the silent-mode setting table 30B, in the item of "OTHER THAN BEING IN VEHICLE", "ON OR OFF" is recorded as the silent mode setting by the second control. That is, the silent mode setting is set to be ON or OFF by the user with being associated with the desired set time.

When the set time of the second control is not set, or when it is determined to be the second state after having determined to be the first state before the set time is not reached, the control program 30A can provide the following various functions concerning the canceling of the silent mode setting by the second control. That is, when it is determined to be the second state after the silent mode setting by the second control is set, the control program 30A can cancel the silent mode setting by the second control, and return to the setting for performing a certain notification before setting the silent mode setting by the second control, for example.

The storage 30 stores therein data of desired set time set by the user in order to enable the silent mode setting by the second control, as the data used in the process based on the control program 30A. The data of the desired set time set by the user in order to enable the silent mode setting by the second control may be set to the silent-mode setting table 30B.

The controller 40 integrally controls operation of the mobile electronic device 1 and implements various functions, by executing processes based on the various programs stored in the storage 30. The controller 40 include a central processing unit (CPU), a system-on-a-chip (SoC), a micro control unit (MCU), and a field-programmable gate array (FPGA), for example, but not limited thereto.

The controller 40 refers to a variety of data stored in the storage 30 as needed. The controller 40 reads command codes included in the various programs stored in the storage 30 in sequence, and by executing the read command codes, implements various functions. The controller 40 controls the operation of the display 11, the communicator 12, the acceleration sensor 14, the sound processor 20, and others so that the various processes of the mobile electronic device 1 are executed in appropriate procedures in accordance with the operation of the operation part 13 and with the various programs stored in the storage 30.

The controller 40 executes various processes, by executing the control program 30A stored in the storage 30.

The controller 40 determines, based on the detection result by the acceleration sensor 14, whether the user of the mobile electronic device 1 is in the first state or in the second state. The controller 40 measures the vibration and movement of the mobile electronic device 1 detected by the acceleration sensor 14 and, based on the acceleration pattern obtained from the measurement result of the vibration and movement, determines whether the user is in the first state or in the second state, for example. The controller 40 determines that it is the first state when the acceleration pattern obtained from the measurement result of the vibration and movement of the mobile electronic device 1 matches, with certain accuracy, the acceleration pattern detected in the first state, for example. The controller 40 determines that it is the second state when the acceleration pattern obtained from the measurement result of the vibration and movement of the mobile electronic device 1 does not match the acceleration pattern detected when the user is in the first state, for example. The vehicle in the present embodiment includes a private automobile and the like, in addition to a train and a bus that are public transportation.

The controller 40 enables the silent mode setting based on the first state or the set time. The controller 40, when it is determined to be the first state, refers to the silent-mode setting table 30B. The controller 40 then enables the silent mode setting by the first control. The controller 40, when the reaching of the set time of the second control is detected, refers to the silent-mode setting table 30B. The controller 40 then, based on whether it is the first state, determines whether to enable the silent mode setting by the second control. When it is determined to be the first state, the controller 40 suspends the execution of the silent mode setting by the second control. In contrast, when it is determined to be the second state, the controller 40 enables the silent mode setting by the second control. After having determined to be the first state and having suspended the enabling of the silent mode setting by the second control, when it is determined to be the second state, the controller 40 cancels the suspending and enables the silent mode setting by the second control.

Figure 3:
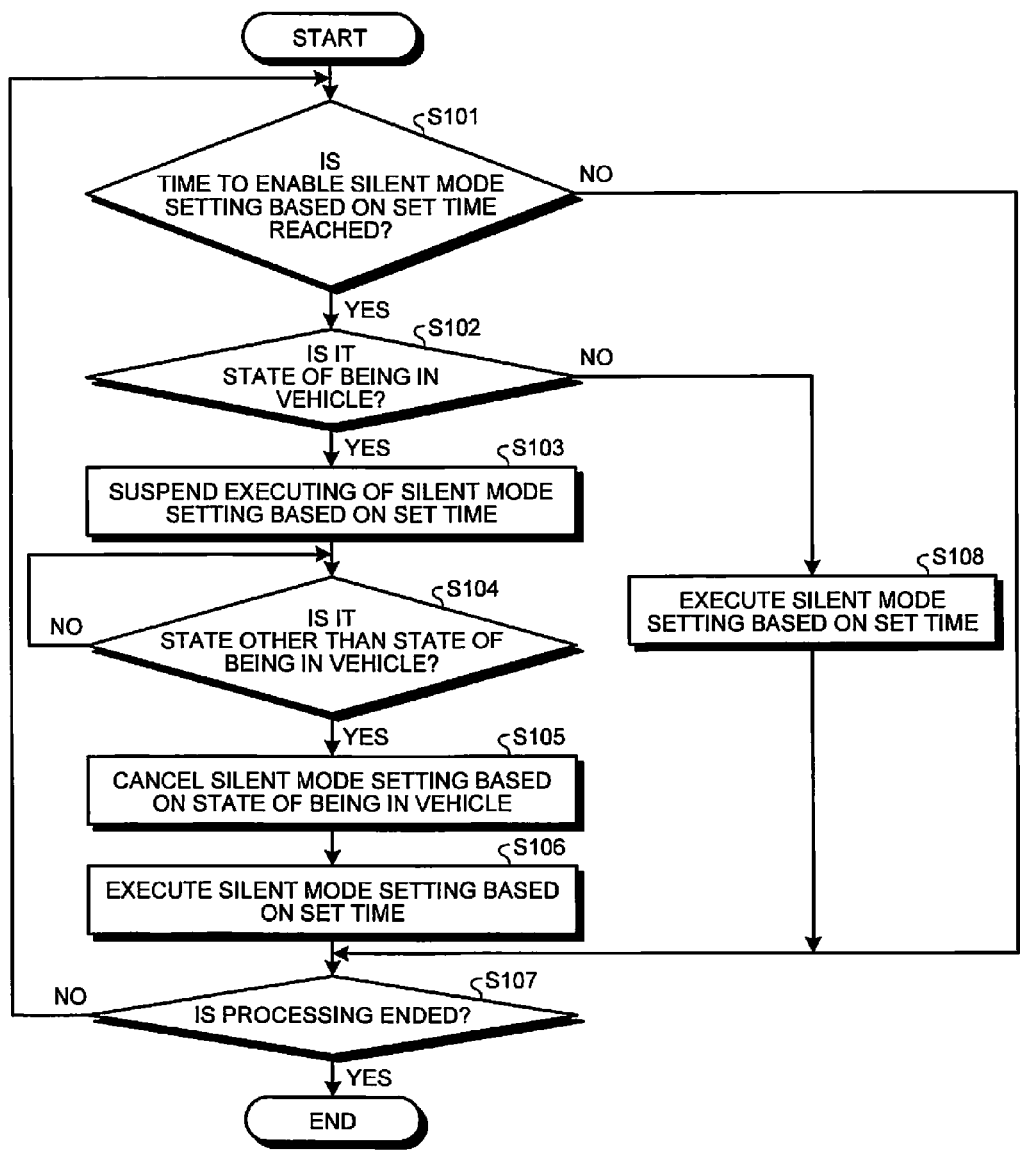
FIG. 3 is a flowchart illustrating a procedure of processing performed by the mobile electronic device in the present embodiment.

FIG. 3 is a flowchart illustrating a procedure of processing performed by the mobile electronic device 1 in the present embodiment. The controller 40 implements the processing procedure illustrated in FIG. 3, by reading and executing the control program 30A stored in the storage 30.

As illustrated in FIG. 3, the controller 40 determines whether the time to enable the silent mode setting based on the set time is reached (Step S101). The controller 40 detects the current time based on a radio-wave time signal of the clock circuit provided inside the mobile electronic device 1, for example. The controller 40 then performs the determination at Step S101 by comparing the current time with the data of the desired set time by the user which is stored in the storage 30 to enable the silent mode setting by the second control.

As a result of the determination, when the time to enable the silent mode setting has been reached (Yes at Step S101), the controller 40 determines whether it is a state of being in a vehicle (Step S102).

When it is a state of being in a vehicle (Yes at Step S102) as a result of the determination, the controller 40 suspends the execution (ON or OFF) of the silent mode setting based on the set time (Step S103). When it is a state of being in a vehicle (Yes at Step S102) as the result of the determination of the controller 40, it is obvious that the mobile electronic device 1 has been already in a state of the silent mode setting base on a state of being in a vehicle.

Subsequently, the controller 40 determines whether it is a state other than the state of being in a vehicle (Step S104). When it is not a state other than the state of being in a vehicle (No at Step S104) as a result of the determination, the controller 40 repeats the determination of Step S104. That is, when it is still in a state of being in a vehicle, the controller 40 repeats the determination of Step S104 until it turns into a state other than the state of being in a vehicle, for example, a state of having dropped off the vehicle.

Meanwhile, when it is a state other than the state of being in a vehicle (Yes at Step S104) as a result of the determination, the controller 40 cancels the silent mode setting based on the state of being in a vehicle (Step S105).

Then, the controller 40 cancels the suspending of Step S103 and executes (ON or OFF) the silent mode setting based on the set time (Step S106).

Subsequently, the controller 40 determines whether to end the processing (Step S107). When ending the processing, there may be power off, a process-ending operation by the user, and others, for example.

As a result of the determination, when ending the processing (Yes at Step S107), the controller 40 ends the processing illustrated in FIG. 3. In contrast, when not ending the processing (No at Step S107), the controller 40 returns to the processing procedure of Step S101 described above.

At Step S102 in the foregoing, when it is not a state of being in a vehicle (No at Step S102) as a result of the determination, the controller 40 executes (ON or OFF) the silent mode setting based on the set time (Step S108), and returns to the processing procedure of Step S107 described above.

At Step S101 in the foregoing, when the time to enable the silent mode setting based on the set time is not reached (No at Step S101) as a result of the determination, the controller 40 moves to the processing procedure of Step S107 described above.

In the present embodiment, when the reaching of the set time to enable a silent mode setting based on the desired set time is detected while executing (ON) the silent mode setting based on a state of being in a vehicle, as the same as the example illustrated in FIG. 3, the controller 40 also suspends the execution (ON or OFF) of the silent mode setting based on the desired set time.

For the full and clear disclosure of the technology concerning the appended claims, characteristic embodiments have been described. However, the appended claims are not intended to be limited to the above-described embodiments and are intended to be embodied by all of those modifications and alternative configurations that a person skilled in the art can create within the scope of the fundamental matters described in the specification.

For example, the control program 30A illustrated in FIG. 1 may be divided into a plurality of modules. Alternatively, the control program 30A illustrated in FIG. 1 may be combined with other programs.

The mobile electronic device 1 in embodiments only needs to be a portable electronic apparatus having function of giving notice of an event, such as a smartphone and a mobile phone.

The invention claimed is:

1. A mobile electronic device comprising:
at least one controller configured to enable a silent mode setting when a state of being in a vehicle is determined and to enable the silent mode setting when a set time is reached, wherein
the silent mode setting is a setting that defines notification means of the mobile electronic device when an event occurs,
the silent mode setting includes a first notification method in which the event is notified by outputting sound, and a second notification method in which the event is notified by a method other than outputting sound,
the silent mode setting includes a first control and a second control,
the first control is a control for switching between the first notification method and the second notification method based on a moving state of the mobile electronic device, the moving state including the state of being in a vehicle and a state other than the state of being in a vehicle,
the second control is a control for switching between the first notification method and the second notification method based on the set time, and
when the set time is reached after having determined the state of being in a vehicle, the at least one controller is configured
not to enable the silent mode setting by the second control based on the set time,
but to enable the silent mode setting by the first control based on the moving state.

2. The mobile electronic device according to claim 1, wherein
when a state other than the state of being in a vehicle is determined after having determined the state of being in a vehicle, the at least one controller is configured to cancel suspending the enabling of the silent mode setting by the second control, and
enable the silent mode setting by the second control based on the set time.

3. A control method executed by a mobile electronic device including at least one controller configured to enable a silent mode setting when a state of being in a vehicle is determined and to enable the silent mode setting when a set time is reached, wherein
the silent mode setting is a setting that defines notification means of the mobile electronic device when an event occurs,
the silent mode setting includes a first notification method in which the event is notified by outputting sound, and a second notification method in which the event is notified by a method other than outputting sound,
the silent mode setting includes a first control and a second control,
the first control is a control for switching between the first notification method and the second notification method based on a moving state of the mobile electronic device, the moving state including the state of being in a vehicle and a state other than the state of being in a vehicle, and
the second control is a control for switching between the first notification method and the second notification method based on the set time,
the control method comprising:
when the set time is reached after having determined the state of being in a vehicle,
not enabling the silent mode setting by the second control based on the set time, and
enabling the silent mode setting by the first control based on the moving state.

4. A non-transitory storage medium that stores therein a control program for causing a mobile electronic device including at least one controller configured to enable a silent mode setting when a state of being in a vehicle is determined and to enable the silent mode setting when a set time is reached to execute a control method, wherein the silent mode setting is a setting that defines notification means of the mobile electronic device when an event occurs, the silent mode setting includes a first notification method in which the event is notified by outputting sound, and a second notification method in which the event is notified by a method other than outputting sound, the silent mode setting includes a first control and a second control, the first control is a control for switching between the first notification method and the second notification method based on a moving state of the mobile electronic device, the moving state including the state of being in a vehicle and a state other than the state of being in a vehicle, and the second control is a control for switching between the first notification method and the second notification method based on the set time, the control method comprising:

when the set time is reached after having determined the state of being in a vehicle, not enabling the silent mode setting by the second control based on the set time, and enabling the silent mode setting by the first control based on the moving state.

* * * * *